United States Patent
Sonogi

(10) Patent No.: US 9,025,189 B2
(45) Date of Patent: May 5, 2015

(54) MEMORY MANAGEMENT FOR PRINT DATA OBJECTS

(71) Applicant: Canon Kabushiki Kaisha, Tokyo (JP)

(72) Inventor: Katsutoshi Sonogi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/086,466

(22) Filed: Nov. 21, 2013

(65) Prior Publication Data

US 2014/0168695 A1 Jun. 19, 2014

(30) Foreign Application Priority Data

Dec. 14, 2012 (JP) ................. 2012-274052

(51) Int. Cl.
- G06F 15/00 (2006.01)
- G06K 1/00 (2006.01)
- G06F 3/12 (2006.01)
- G06K 15/00 (2006.01)
- G06K 15/02 (2006.01)

(52) U.S. Cl.
CPC .................. G06K 15/1865 (2013.01)

(58) Field of Classification Search
None
See application file for complete search history.

(56) References Cited

U.S. PATENT DOCUMENTS

| | | | |
|---|---|---|---|
| 7,209,258 B1* | 4/2007 | Markovic et al. | 358/1.18 |
| 2006/0279814 A1* | 12/2006 | Fukada et al. | 358/540 |
| 2008/0137135 A1* | 6/2008 | Takeishi | 358/1.15 |
| 2008/0309980 A1* | 12/2008 | Iguchi | 358/1.18 |
| 2009/0168085 A1 | 7/2009 | Suzuki | |
| 2012/0050765 A1* | 3/2012 | Mori | 358/1.9 |

FOREIGN PATENT DOCUMENTS

JP 2009-159494 A 7/2009

* cited by examiner

*Primary Examiner* — Ming Hon
(74) *Attorney, Agent, or Firm* — Fitzpatrick, Cella, Harper & Scinto

(57) ABSTRACT

An image forming apparatus according to the present invention generates objects based on print data, stores the generated objects, determines whether or not a series of objects to be subjected to pseudo-transparency processing in the stored objects is subjected to an avoidance processing to deal with a shortage of the memory, which includes rendering objects to create a bitmap, encoding the bitmap for lossy compression and storing the compressed image as a new object, and controls execution of the avoidance processing on the basis of the determination result.

13 Claims, 9 Drawing Sheets

MEMORY MANAGEMENT FOR PRINT DATA OBJECTS

BACKGROUND OF THE INVENTION

1. Field of the Invention

The present invention relates to an image forming apparatus and a control method for an image forming apparatus that perform avoidance processing in which intermediate data is converted into bitmap data and lossy compression processing is performed when memory is insufficient for example, and thereby data size is compressed and free memory space is retained.

2. Description of the Related Art

Normally, an apparatus having a printing function such as a multi-function peripheral converts page description language (hereinafter referred to as "PDL") transmitted from a host by a printer driver into intermediate data that is appropriate for rendering in a print apparatus, and stores it in a memory. The print apparatus generates bitmap data from the intermediate data by performing rendering processing. In recent years, there are various rendering expressions created from host applications, and rendering expressions for expressing transparency are increasing in number. In printing apparatuses, due to interface limitations or the like, there are cases in which transparency in image data created by an application is reproduced with pseudo-transparency using multiple rendering patterns. In pseudo-transparency, reproduction is performed through processing for masking a background image in a transparent region and a foreground image with a rendering pattern and performing overlaying multiple times. In overlaying processing, the background image and the foreground image are alternatingly expressed by performing exclusive OR processing (XOR processing) twice in the transparent region.

There is a problem in this transparency processing in that problems accompany compositing since multiple rendering objects that are to be composited are created. Japanese Patent Laid-Open No. 2009-159494 is an example of a conventional technique for avoiding image problems that occur in pseudo-transparency processing. Japanese Patent Laid-Open No. 2009-159494 discloses a method of detecting a transparent object group such that attribute information is appropriately updated so as to eliminate problems that occur due to the attribute information of rendering objects being overwritten when transparency processing is expressed using multiple rendering objects that are XOR processing.

On the other hand, with the technique of generating bitmap data from intermediate data by performing rendering processing, avoidance processing is performed in order to address memory insufficiency. Avoidance processing is performed when a phenomenon occurs in which the upper limit value of memory capacity for holding intermediate data when generating the intermediate data is exceeded (hereinafter referred to as "memory overflow"). If memory overflow occurs during the generation of intermediate data, the printing apparatus suspends the generation of intermediate data from PDL data, renders the intermediate data that has been generated in the memory at that time so as to generate bitmap data. The generated bitmap data is used as a background image in the image corresponding to the intermediate data that is to be generated from the remaining unprocessed PDL data. Then, the printing apparatus subjects the bitmap data that is the background image to lossy compression using lossy encoding processing and stores it as a compressed image such that the background image and the intermediate data to be generated from the remaining PDL data can be held in the memory. Subsequently, the printing apparatus deletes the processed intermediate data from the memory, creating free space in the memory. Performing this kind of avoidance processing realizes the reduction of memory capacity used for the intermediate data.

However, with the technique disclosed in Japanese Patent Laid-Open No. 2009-159494, even if the pseudo-transparency processing is detected, regions including noise are formed in the image composited with the background image, depending on the timing of transitioning to the avoidance processing. This is because of the following reasons.

With pseudo-transparency processing, arithmetic processing called exclusive OR processing for identical objects is performed. If avoidance processing is performed while the exclusive OR processing is being performed, or in other words, in the stage at which intermediate data that corresponds to the first item of the exclusive OR operation is generated, noise that accompanies compression processing (e.g., block noise, mosquito noise, and the like) appears in the transparent regions in the post-expansion background image. If the intermediate data that corresponds to the second item of the exclusive OR processing is composited with a background image that includes this kind of noise, the noise will be especially noticeable. This is also because, only giving consideration to the exclusive OR processing, only the portions with noise will remain due to that calculation. In this way, the quality of the image that is ultimately generated further deteriorates depending on the timing at which the intermediate data undergoes the avoidance processing during rendering processing such as pseudo-transparency processing.

SUMMARY OF THE INVENTION

The present invention, in one aspect, aims to suppress, to the greatest extent possible, the deterioration of image quality caused by avoidance processing, even in the case where pseudo-transparency processing is performed.

The present invention has the following configuration.

According to one aspect of the present invention, there is provided an image forming apparatus comprising: a generation unit configured to generate objects based on print data and store the generated objects in a memory; a processing unit configured to execute avoidance processing for a shortage of the memory, the avoidance processing including rendering objects stored in the memory into a single bitmap, subjecting the single bitmap to lossy compression, and storing the compressed image as a new object in the memory; and a control unit configured to, on the basis of an order in which the objects stored in the memory are processed, determine whether or not a series of objects for pseudo-transparency processing that is included in the objects stored in the memory is to be subjected to the avoidance processing, and control execution of the avoidance processing on the basis of the determination result.

According to one aspect of the present invention, it is possible to generate an image with little noise by detecting a combination of pseudo-transparency processes included in intermediate data when avoidance processing is to be performed, and adjusting the timing of rendering processing for a rendering object.

Further features of the present invention will become apparent from the following description of exemplary embodiments with reference to the attached drawings.

DESCRIPTION OF THE EMBODIMENTS

Embodiments for implementing the present invention will be described below with reference to the drawings.

Embodiment 1

Configuration of Printer

Figure 1:
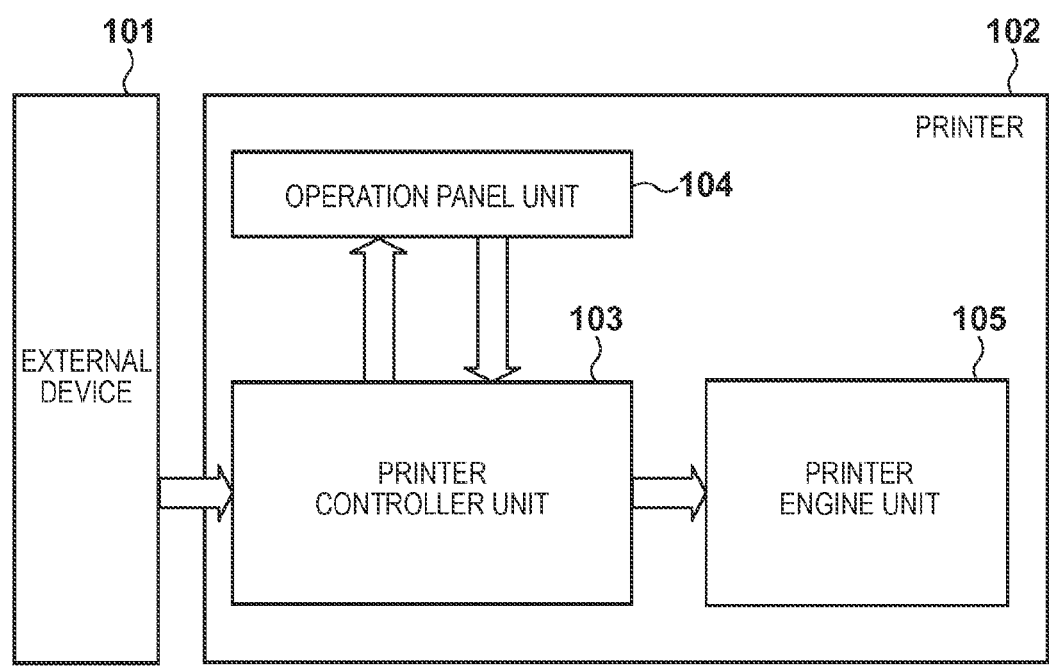
FIG. 1 is a block diagram showing a configuration of a printer that is an embodiment of a printing apparatus of the present invention.

FIG. 1 is a block diagram showing a configuration of a printer that is an embodiment of a printing apparatus implementing the present embodiment. Note that the printing apparatus is an example of an image forming apparatus. A printer 102 includes a printer controller unit 103, a printer engine unit 105, and an operation panel unit 104. The printer controller unit 103 receives input of print data (including code data described with PDL) from an external device 101 such as a host computer (hereinafter referred to as a "host"). Image data (page information) is generated due to the print data being analyzed. The generated image data is transmitted to the printer engine unit 105 via an interface. The printer engine unit 105 forms an image expressed by the image data generated by the printer controller unit 103 on a sheet using an electrophotographic process. The printer engine unit 105 includes mechanisms and an engine control unit that performs control related to processes for print processing performed by the mechanisms. The operation panel unit 104 is a user interface and performs an input operation for instructing an operation desired by the user to the printer 102.

Configuration of Printer Controller Unit

Figure 2:
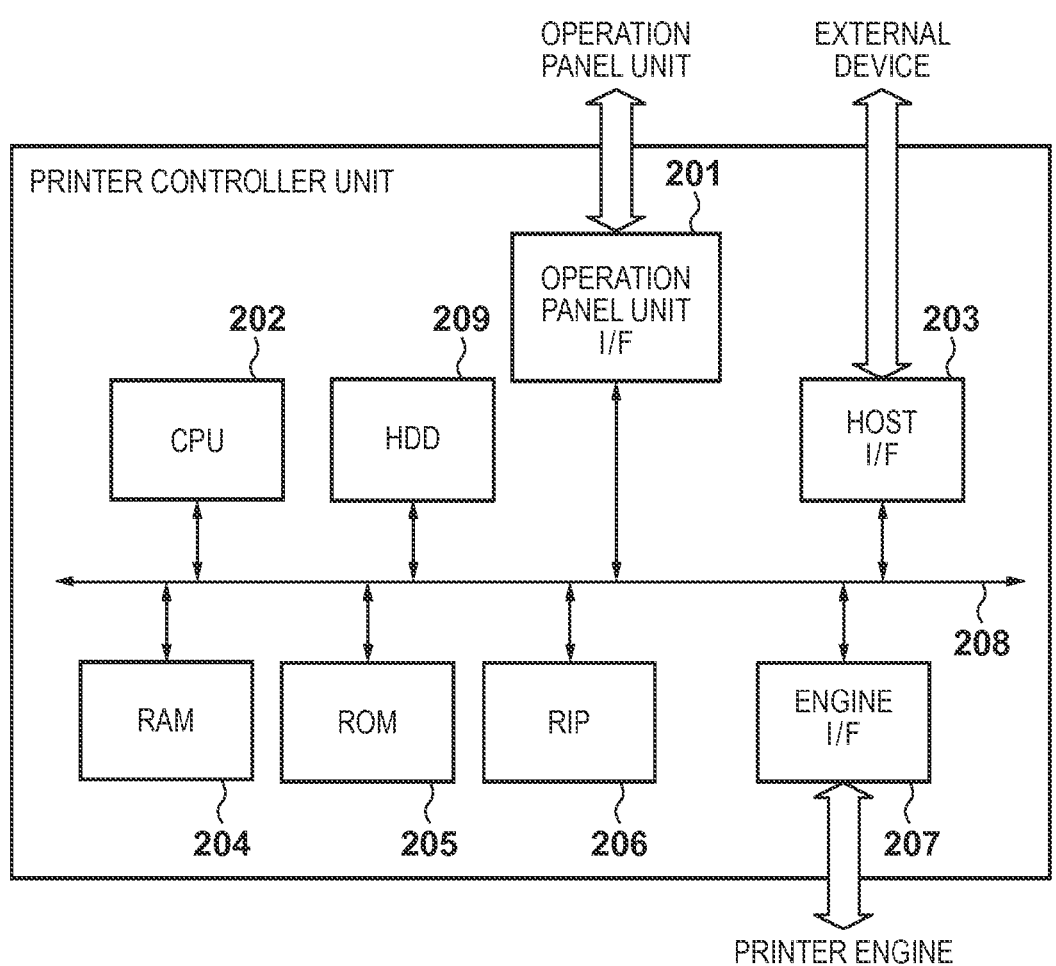
FIG. 2 is a block diagram showing an example of a configuration of a controller unit for devices according to an embodiment.

A configuration of the printer controller unit 103 will be described next with reference to FIG. 2. The printer controller unit 103 has a CPU 202 for performing overall control of the printer control unit 103, and the CPU 202 is part of an input-output unit for data (including various types of PDL data) that is exchanged with the external device 101. A RAM 204 is a system work memory for the operation of the CPU 202 and is an image memory for temporary storage of generated intermediate data, compressed bitmap data, input image data, and the like. Furthermore, system control code and programs for executing later-described processes are stored in a ROM 205. The CPU 202 loads control code and programs stored in the ROM 205 to the RAM 204 and executes them, and thereby performs overall control of the printer 102 and performs the later-described processes. Also, the printer controller unit 103 has a host I/F 203 that controls communication with the external device 101.

A raster image processor (RIP) 206 develops PDL data and the like into bitmap data. Based on code data input via the host I/F 203, the CPU 202 uses the RIP 206 to create bitmap data that can be processed by the printer engine unit 105, in accordance with the control code stored in the ROM 205. Note that in the present embodiment, intermediate data is generated by the CPU 202 using software, and the generation of bitmap data based on the intermediate data is performed using the RIP 206. The created bitmap data is transferred to the printer engine unit 105 as a video signal via an engine I/F unit 207. The engine I/F unit 207 is part of an input-output unit for signals exchanged with the printer engine unit 105, and controls communication with the printer engine unit 105.

Instructions and the like related to mode settings issued from the panel unit 104 (shown in FIG. 1) due to the input of an operation are input via an operation panel I/F unit 201, and the operation panel I/F unit 201 constitutes an interface between the panel unit 104 and the CPU 202. The CPU 202 performs control of the above-described blocks in accordance with the mode instructed by the panel unit 104, and this control is executed based on the control code stored in the ROM 205. The blocks including the above-described CPU 202 are connected to a system bus 208 such that they are accessible by the CPU. An HDD 209 is a hard disk drive that stores system software for various processes, input image data, and the like.

Configuration of Controller Software

Figure 3:
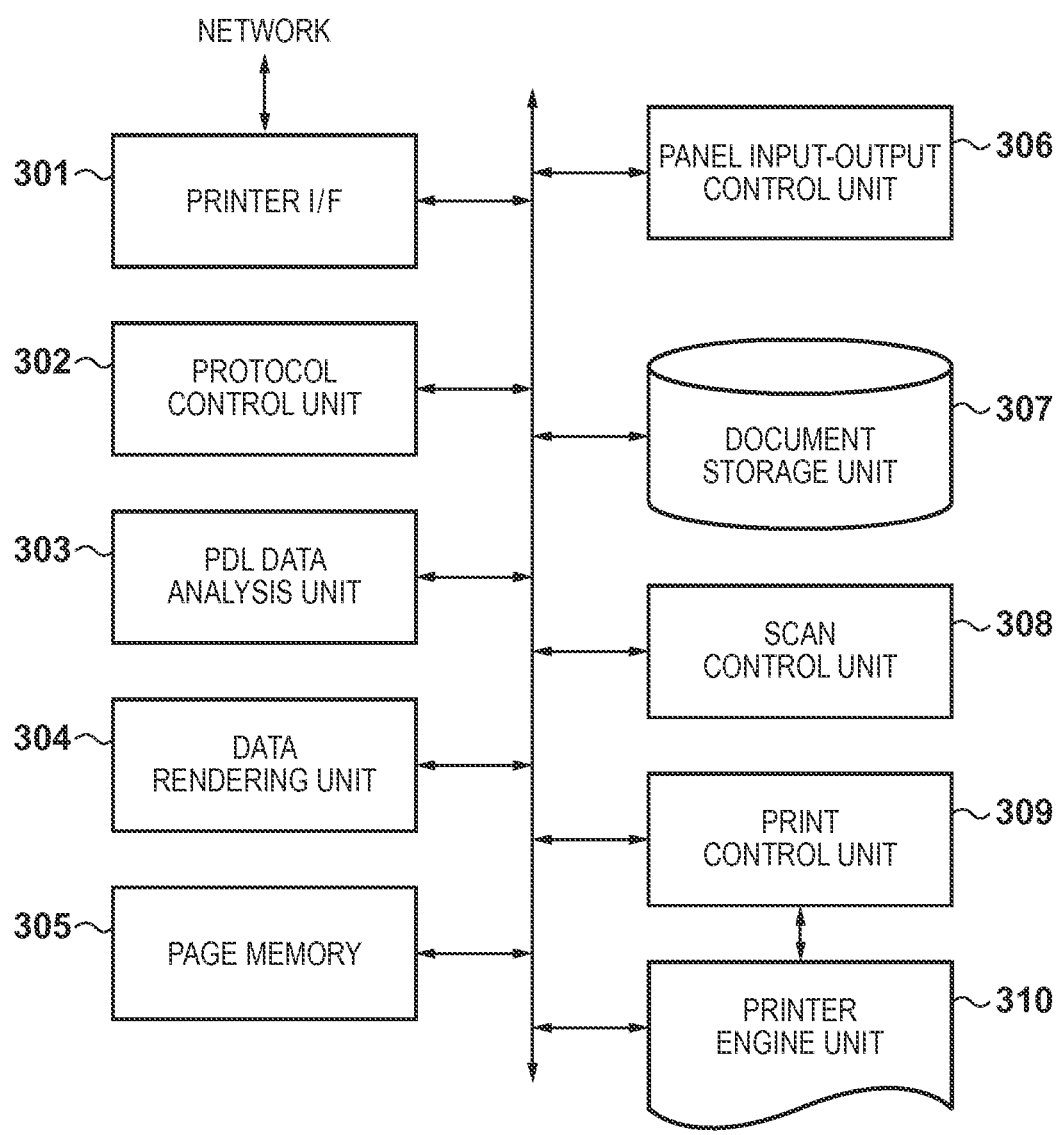
FIG. 3 is a diagram showing an example of a configuration of controller software according to an embodiment.

FIG. 3 is a block diagram showing a configuration of controller software for controlling the operation of the printing apparatus. The blocks represent functional blocks that are realized by the CPU 202 executing corresponding programs. A printer interface 301 is a means for controlling network input and output with external devices by the host I/F 203. A protocol control unit 302 is a means for communicating with external devices by analyzing and transmitting network protocol data. The printer interface 301 receives PDL data transmitted from an external network and subsequently stores it in a document storage unit 307.

Figure 4:
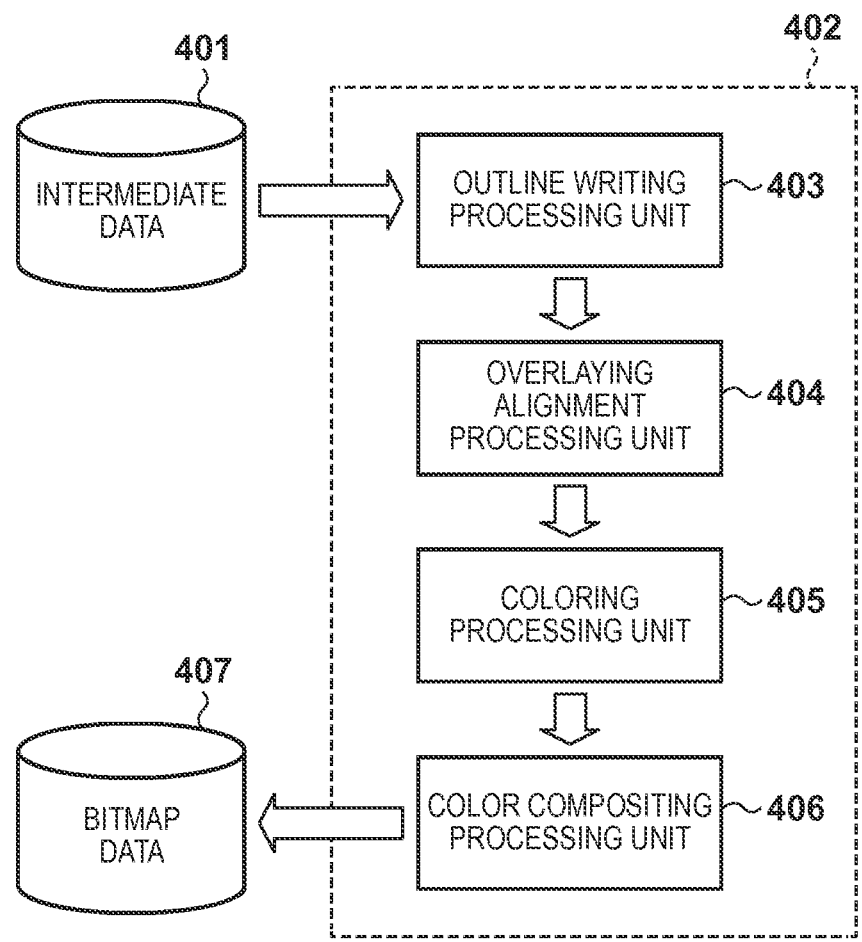
FIG. 4 is a block diagram showing an example of a configuration of a rendering method for print data according to an embodiment.

A PDL data analysis unit 303 is a means for analyzing PDL data deployed to the document storage unit 307 by the CPU 202 and converting each rendering object into intermediate data 401 (shown in FIG. 4). The rendering object is a character (text object), a graphic (graphic object), a photograph (image object), or the like. The intermediate data 401 that was generated in the PDL data analysis unit 303 is delivered to a data rendering unit 304 via the document storage unit 307 and is processed.

The data rendering unit 304 is software for the CPU 202 to generate bitmap data from intermediate code, and the RIP 206 is used when the software is executed. Also, in the present example, the RIP 206 is a scan line renderer for generating bitmap data in units of scan lines. The data rendering unit 304 is processing for developing intermediate data 401 into bitmap data using the rendering method of the scan line renderer 402 (see FIG. 4), and the developed bitmap data will be successively rendered in a page memory 305.

The page memory 305 is a region that is retained in the RAM 204, the HDD 209, or the like, and temporarily holds bitmap data developed by the data rendering unit 304.

A panel input-output control unit 306 controls input and output performed by the operation panel I/F 201 with the operation panel 104. The panel input-output control unit 306 displays bitmap data generated for preview in the page memory 305 on the operation panel unit 104. Also, the panel input-output operation unit 306 successively displays bitmap data developed in the page memory 305 on the operation panel unit 104 each time a preview image is updated.

The document storage unit 307 is a means for storing data files including vector data and intermediate data 401 in units of groups of input documents (jobs), and is realized by a secondary storage device such as a hard disk exemplified by the RAM 204 or the HDD 209. If the data size of the region to be used for temporary storage is determined for each piece of data, and intermediate data 401 that exceeds a predetermined upper limit value is received, the document storage unit 307 notifies the CPU 202 that the upper limit value has been exceeded, and the avoidance processing is started by suspending intermediate data generation processing that was being performed up to that point in time. The details of avoidance processing will be described later. Avoidance processing can also be referred to as fallback processing, degeneration processing, or the like. Also, in the present embodiment, a region for temporarily recording the rendering pattern (e.g., stack of operations, intermediate data, or the like) performed by a series of ROPs (raster operations) in which image problems occur in avoidance processing is provided separate from the intermediate data 401.

A print control unit 309 performs processing for converting the content of the page memory 305 into video signals and transmits images to the printer engine unit 105 via the engine I/F unit 207.

In the avoidance processing, the data rendering unit 304 generates bitmap data that is to be a background image by rendering the intermediate data that has been stored up to that point in time and stores the bitmap data in the page memory 305, and the print control unit 309 subjects the bitmap data in the page memory 305 to lossy compression processing and stores it in the document storage unit 307. Subsequently, the intermediate data that was the target of rendering is deleted. When the compressed background image is stored in the document storage unit 307 as one piece of intermediate data, the intermediate data generation processing that was suspended when the avoidance processing started continues. This is an overview of avoidance processing, and the details of a series of avoidance processes will be described with reference to FIG. 7 and the like.

When the PDL data analysis unit 303 finishes generating the intermediate data 401 from the remaining PDL data and one page-worth of intermediate data is present, rendering processing is started based on the intermediate data. If the compressed background bitmap data has been deployed as intermediate data by the avoidance processing, decompression processing is first performed. The print control unit 309 decompresses the background image data that underwent lossy compression processing and transmits the decompressed bitmap data to the data rendering unit 304. By overlaying and rendering bitmap data 407 that is the result of rendering the remaining intermediate data 401, and the bitmap data that was decompressed by the print control unit 309, the composited bitmap data 407 is deployed to the page memory 305 by the data rendering unit 304. With the avoidance processing, a series of processes are repeated until the generation of the intermediate data 401 by the PDL data analysis unit 303 ends. The printer engine unit 105 is a print mechanism unit for forming received video signals into permanent visible images on a recording material.

Configuration of Scan Line Renderer 402

FIG. 4 is a block diagram showing a configuration of the scan line renderer 402 in the data rendering unit 304.

The intermediate data 401 is intermediate code obtained by the conversion of PDL data by the PDL data analysis unit 303. In the scan line renderer 402, the intermediate data 401 is input data, and the bitmap data 407 is generated via an outline writing processing unit 403, an overlay alignment processing unit 404, a coloring processing unit 405, and a color compositing processing unit 406. The bitmap data 407 is held in the page memory 305.

The outline writing processing unit 403 is processing for obtaining outline information from the rendering object included in the intermediate data 401. The outline information refers to two pieces of information, namely the starting point position of the outline of the rendering object and the outline width. When outline information corresponding to one scan line of image data is obtained by the outline writing processing unit 403, the outline coordinate information is sent to the subsequent overlay alignment processing unit 404.

The overlay alignment processing unit 404 performs alignment processing such that the rendering objects are overlaid in the correct order on the sheet surface, based on the outline coordinate information and the vertical overlay relationship of the rendering objects. When aligned outline information corresponding to one scan line of image data is present, it is sent to the coloring processing unit 405.

The coloring processing unit 405 adds color information to each segment that is partitioned by an outline, with respect to the aligned outline information. The aligned outline information to which the color information generated by the coloring processing unit 405 was added is sent to the color compositing processing unit 406 when one scan line of it is present.

The color compositing processing unit 406 applies an overlaying rule that is in accordance with the intermediate data 401 to regions partitioned by the outline based on the aligned outline information to which the color information was added, and among those partitioned regions, to portions that are overlaid with regions partitioned by other outlines. An ROP (Raster Operation) and alpha blending are examples of overlaying rules.

The ROP is a logical operation performed with bits expressing color values in both the foreground and the background in portions of overlapping regions. If ROP is designated as the overlaying rule, the result to be output is obtained by performing a logical operation between the color values expressing regions in the foreground and the background.

Alpha blending designates a ratio for when outputting a mixture of the colors of both the foreground and the background in a portion of overlapping regions partitioned by an outline.

In the color compositing processing unit 406, the overlaying rule that corresponds to the intermediate data 401 is applied, and it is determined which color to output based on the foreground and background regions in the overlapping regions. The data generated by the color compositing processing unit 406 is bitmap data 407 that is output as color information for each pixel of image data.

Figure 5:
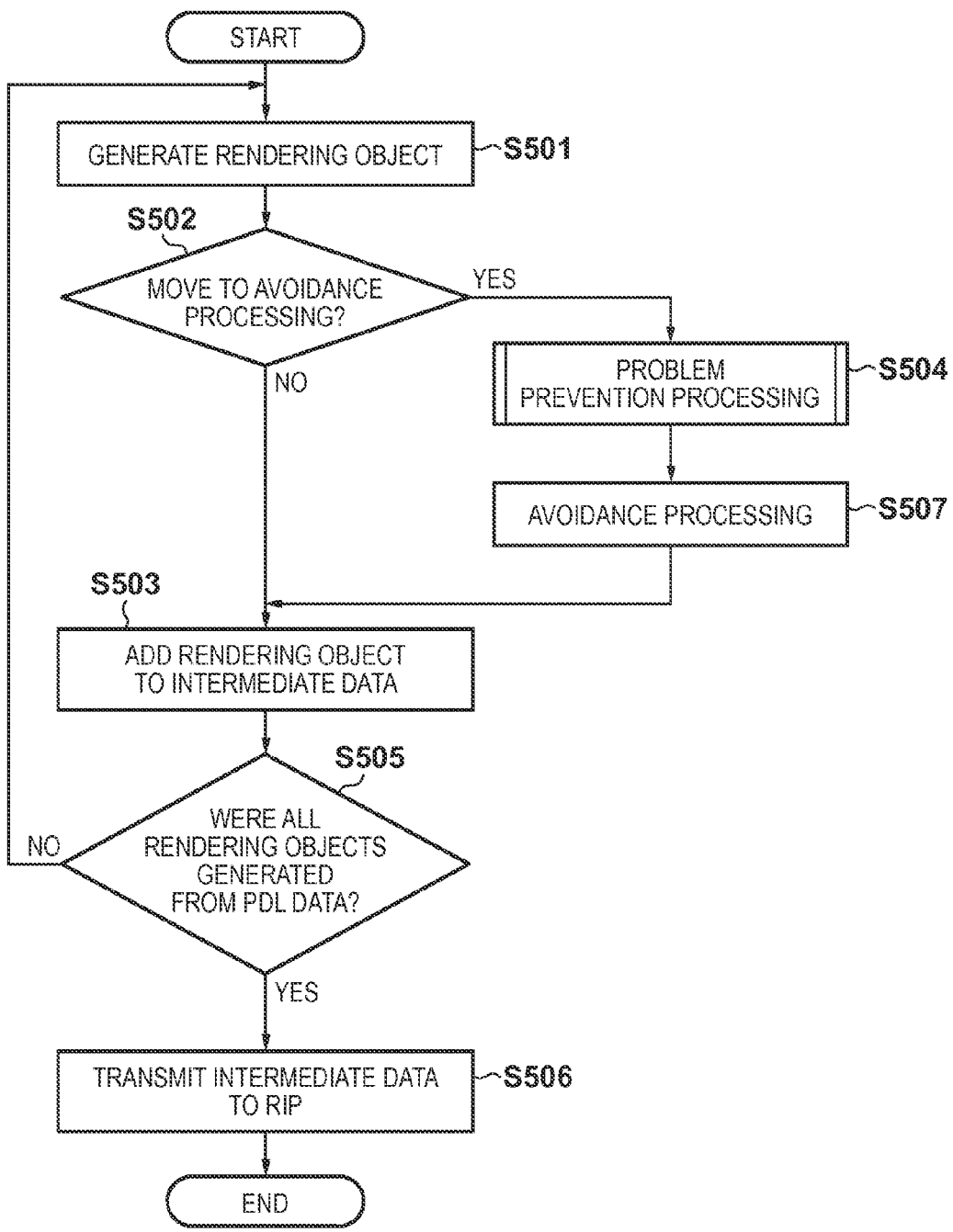
FIG. 5 is a flowchart showing a determination method for when avoidance processing is to be performed according to Embodiment 1.
Figure 6:
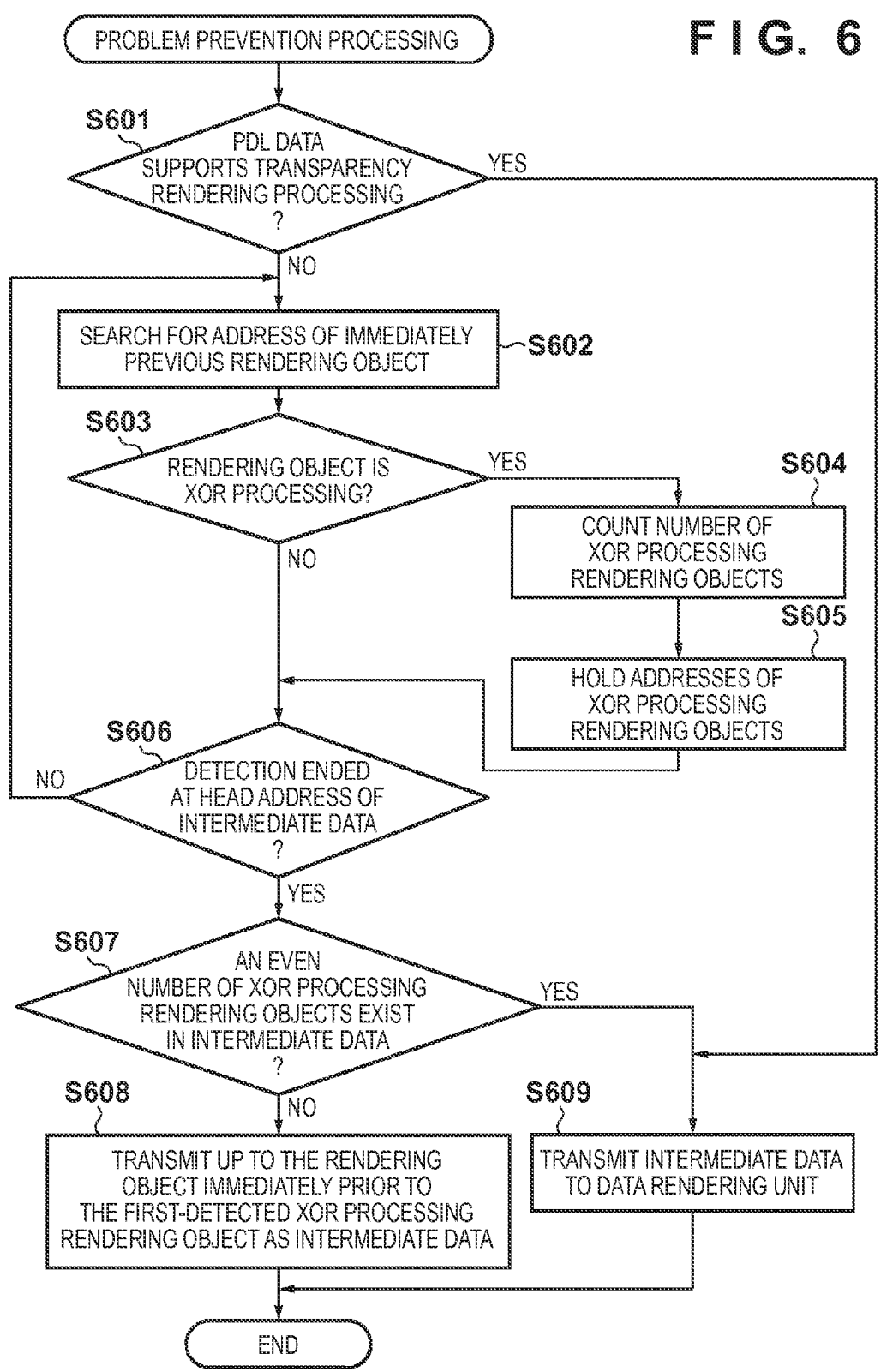
FIG. 6 is a flowchart showing a method of determining whether or not a rendering problem will occur in pseudo-transparency processing after avoidance processing according to Embodiment 1 is performed and avoiding the rendering problem.
Figure 8A:
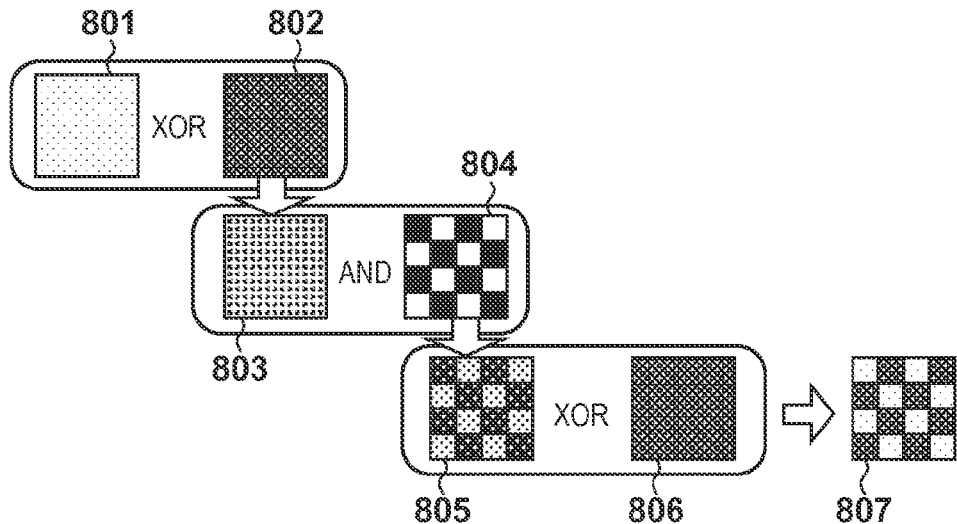
FIGS. 8A, 8B, and 8C are diagrams showing aspects of rendering processing for pseudo-transparency in Embodiment 1 and Embodiment 2.
Figure 8B:
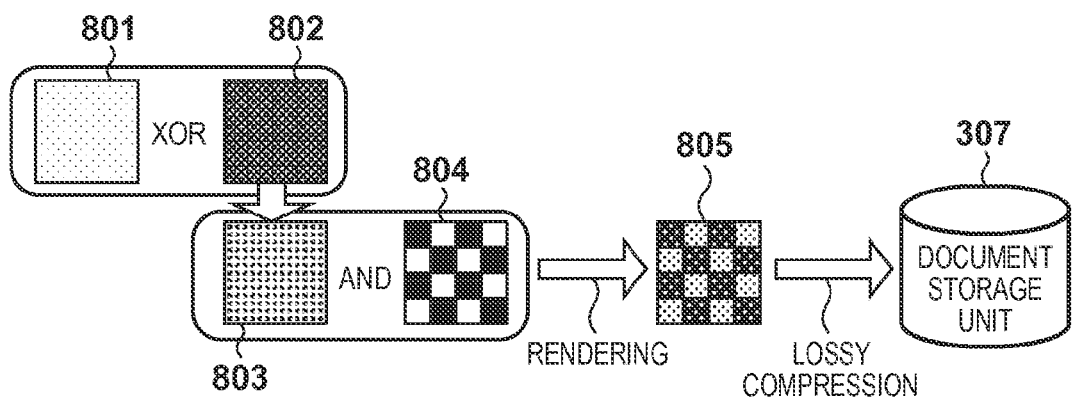
Figure 8C:
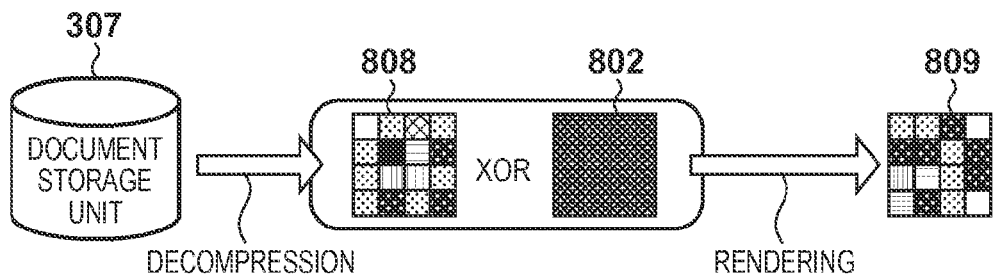

Procedure of Processing for Generating Image Data that Includes Avoidance Processing In the present embodiment, a case will be described in which memory overflow occurs while the intermediate data 401 is being generated by the PDL data analysis unit 303, and avoidance processing is executed. If the avoidance processing is not performed, processing based on the conventional technology is implemented, and image data in units of pages is controlled and printed. With reference to FIGS. 5 and 6, a process will be described in which, when the avoidance processing is to be executed, the PDL data analysis unit 303 determines whether or not a rendering pattern in which a rendering problem occurs is included in the generated intermediate data, and transmits the intermediate data to the data rendering unit 304. FIGS. 8A to 8C are diagrams for describing a rendering pattern in which a rendering problem can occur if the avoidance processing is executed. A program for executing the processing of the flowcharts in FIGS. 5 and 6 is stored in the ROM 205 and is loaded to the RAM 204 and executed by the CPU 202.

FIG. 5 shows processing for the PDL data analysis unit 303 to generate a rendering object in the document storage unit 307 based on the intermediate data 401. Although this processing is described below focusing on the functional blocks in FIG. 3, this processing is executed by the CPU 202 using the RIP 206.

In step S501, the PDL data analysis unit 303 analyzes PDL data and generates a rendering object.

In step S502, the PDL data analysis unit 303 determines whether or not the amount of memory usage of the intermediate data 401 will exceed the upper limit value if the generated rendering object is converted into intermediate data and added to the intermediate data 401. If, as a result of this determination, the PDL data analysis unit 303 determines that the amount of memory usage of the intermediate data 401 will exceed the memory upper limit value (YES in step S502), it moves to the avoidance processing. In step S504, when the PDL data analysis unit 303 moves to the avoidance processing at this timing, it is determined whether or not processing of a render pattern that can cause a rendering problem is being performed, and according to the result of the determination, processing for preventing the problem is performed. The details of the determination processing of step S504 will be described later with reference to the flowchart in FIG. 6.

On the other hand, if it is determined in step S502 that the avoidance processing will not be performed, in step S503, the PDL data analysis unit 303 adds the rendering object that was immediately previously generated in step S501 to the intermediate data 401. In step S505, the PDL data analysis unit 303 determines whether or not all rendering objects have been generated from the PDL data. If unprocessed PDL data still remains, the PDL data analysis unit 303 starts generating the rendering objects in step S501 again. Thereafter, if the PDL data analysis unit 303 repeats the processing of steps S501 to S505 and subsequently ends the analysis of the PDL data without moving to the avoidance processing, in step S506, the PDL data analysis unit 303 transmits the intermediate data 401 to the data rendering unit 304. In step S507, the avoidance processing is executed in the manner described above. Note that in the description of FIG. 5, the avoidance processing is the processing up to when the intermediate data (rendering object) that was already generated is rendered, subjected to lossy compression, and then stored in the intermediate data 401 as a new rendering object. The generation of intermediate data and the rendering of an entire page that follow thereafter are not included in the avoidance processing in the description of FIG. 5, but rather are continued from step S503 as normal intermediate data generation processes. Note that when final page data generation is performed, the intermediate data generated in the avoidance processing is decompressed by the print control unit 309, not the RIP 206.

Problem Prevention Processing

FIG. 6 is a diagram for describing the details of the processing of step S504. Before the avoidance processing is executed, the PDL data analysis unit 303 detects whether or not there is a predetermined special rendering pattern that will cause a rendering problem in the intermediate data 401 due to the avoidance processing. Here, in Embodiment 1, pseudo-transparency processing is targeted as the special rendering pattern that causes the rendering problem. Recent years have seen an increase in data including transparency, such as transparency processing being used for gradation rendering and the like from applications. Here, depending on the type of PDL that is supported by the printer 102 when transparency is expressed in the printer 102, there are cases where PDL data in which transparency included in image data edited by an application is expressed by pseudo-transparency is transmitted to the printer 102. Whether transparency is expressed by alpha blending or by pseudo-transparency depends on the API of the operating system, for example. For example, with Windows (registered trademark), alpha blending is supported by XPS, and pseudo-transparency is not needed. In contrast, with GDI, alpha blending is not supported and transparency is described using pseudo-transparency. In this case, a print job generated by a host and output to a printer is described in PDL code that includes pseudo-transparency.

Here, pseudo-transparency will be described with reference to FIGS. 8A to 8C. As an example of data that expresses pseudo-transparency, the following describes a combination of ROPs, namely exclusive OR processing (XOR processing), AND processing, and exclusive OR processing (XOR processing). In the example shown in FIGS. 8A to 8C, a colored translucent image 802 is overlaid on top of a background image 801 due to editing performed by application software or the like.

FIG. 8A shows an image obtained each time the rendering processes exclusive OR (XOR processing) and AND (AND processing), which are states in a series of processes for pseudo-transparency, are applied. Also, the operators and operands in the processing shown in FIG. 8A are all included in the intermediate data 401 as rendering objects.

First, the color compositing processing unit 406 overlays the background image 801 and the transparent image 802 using XOR processing and generates a composite image 803. Overlaying using XOR processing is performed by calculating the exclusive OR of two pixel values at the same position when overlaid, for all overlapping portions. Even if the type of operation is replaced by AND processing, OR processing, or overwriting, the procedure of processing for compositing two pieces of image data is similar to this. Next, as a result of compositing a masked checkerboard-pattern image pattern (mask image) 804 with the composite image 803, the color compositing processing unit 406 generates an image 805. Each grid of the checkerboard pattern is the size of one pixel, for example, and the black portions of the grids have a pixel value of 0 and the white portions have the largest pixel value (all "1"). Finally, the color compositing processing unit 406 composites the transparent image 802 with the image 805 using XOR processing again and generates a pseudo-transparent image 807. As a result of this, if B is the pixel value in a region of the background image 801 with transparency, and if T is the pixel value at the corresponding position in the transparent image 802, in black portions of the checkerboard pattern, (B+T)*0+T=T, or in other words, the pixel value of the transparent image 802 appears, and in white portions of the checkerboard pattern, (B+T)*1+T=B, or in other words, the pixel value of the background image 801 appears. In this way, the color compositing processing unit 406 renders a pseudo-transparent image 807 that expresses both the checkerboard-patterned background image 801 and the transparent image 802 in regions of transparency by executing the series of ROP processes, namely XOR processing, AND processing, and XOR processing.

On the other hand, FIGS. 8B and 8C are diagrams for describing examples in which avoidance processing is executed while the above-mentioned series of ROP processes are being performed.

FIG. 8B shows a case in which avoidance processing is performed while the PDL data analysis unit 303 is generating intermediate data that corresponds to rendering objects from the background image 801 up to the image 805 in the pseudo-transparency processing. In this case, the PDL data analysis unit 303 transmits the intermediate data 401 that corresponds to rendering objects up to and including the composite image 805 to the data rendering unit 304. Here, the data rendering unit 304 outputs the composite image 805 that has been linked to a masked image to the page memory 305 as the bitmap data 407 using the avoidance processing. The print control unit 309 subjects the bitmap data 407 in the page memory 305 that was output from the data rendering unit 304 to lossy compression and stores it in the document storage unit 307.

Then, the PDL data analysis unit 303 generates rendering objects from the remaining PDL data, and when one page-worth of intermediate data is present, transmits the intermediate data 401 to the data rendering unit 304. At this time, the print control unit 309 decompresses the bitmap data in the document storage unit 307 that underwent lossy compression and transmits it to the data rendering unit 304. When the remaining intermediate data 401 is to undergo rendering processing by the data rendering unit 304, the color compositing processing unit 406 composites the decompressed data that was transmitted from the print control unit 308 as the background image. The color compositing processing unit 406 composites the decompressed data 808 and the transparent image 802 with XOR processing and generates a pseudo-transparent image 809.

Since the bitmap data 407 that was obtained from the page memory 305 by the print control unit 309 underwent lossy compression, at this time, it is bitmap data 808 that is different from the original masked image 805. Because of this, even if the series of ROP processes including two instances of XOR processing is performed, the transparent image and the background image are not next to each other and displayed alternatingly, and the pseudo-transparent image 809 is an image with noticeable noise. In particular, the pseudo-transparency processing is carried out only in transparent regions, and noise in transparent regions is particularly noticeable in comparison with other regions. In this way, if the timing at which the intermediate data 401 undergoes avoidance processing is at a time that is after the first instance of XOR processing and before the second instance of XOR processing, the image quality during rendering processing will further deteriorate, as in the pseudo-transparent image 809.

The details of the processing of step S504 in FIG. 5 will be described below with reference to FIG. 6. In the flowchart in FIG. 6, the PDL data analysis unit 303 detects whether or not pseudo-transparency processing such as that in FIGS. 8B and 8C exists in the intermediate data 401 when avoidance processing is to be performed.

In step S601, the PDL data analysis unit 303 determines whether or not the PDL data supports transparent rendering. This is because the PDL data distinguishes between PDLs such as XPS (XML Paper Specification) and PDF (Portable Document Format) in which transparency in applications is processed as-is by a printing device. The pseudo-transparency processing determines whether or not the application performing editing in the host involves GDI (Graphics Device Interface). When the print control unit 308 transmits the PDL data to the PDL data analysis unit 303, the type of the PDL data is determined by an analysis based on the information added to the print data. Also, it is possible to determine the type of the PDL data when the PDL data analysis unit 303 analyzes the PDL data. If the PDL data supports transparency as in the case of XPS and PDF, the intermediate data 401 is transmitted as-is to the data rendering unit 303 without performing processing for determining pseudo-transparency processing. On the other hand, if it is determined in step S601 that the PDL data includes pseudo-transparency processing based on the print data information, a search for the pseudo-transparency processing is started.

In step S602, the PDL data analysis unit 303 detects the address at which the previous rendering object from the intermediate data 401 was created.

Figure 9A:
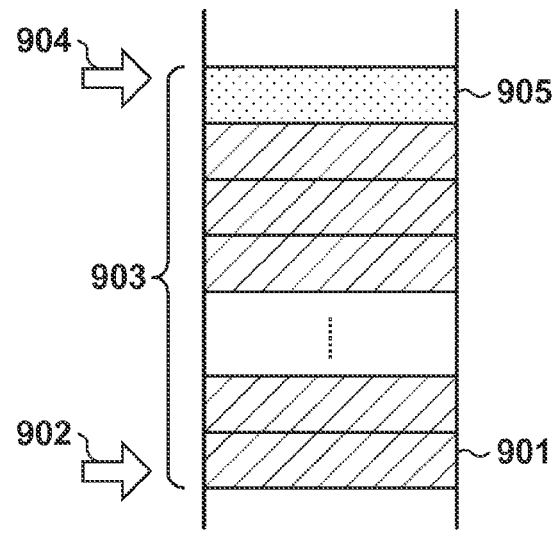
FIGS. 9A and 9B are diagrams showing how intermediate data is generated in a storage region in Embodiment 1 and Embodiment 2.

A method of detecting the rendering objects in step S602 will be described next with reference to FIGS. 9A and 9B. FIG. 9A shows an example of a memory map at a time when the PDL data analysis unit 303 has generated the intermediate data 401 from the PDL data. A rendering object 901 exists at a start address 902 in a generation region for intermediate data. The start address 902 is determined in advance or stored. FIG. 9A shows a rendering object 905 that exceeds an upper limit value 903 of the generation size of the intermediate data 401 when the PDL data analysis unit 303 generates the rendering object 905, and an address 904 for the rendering object 905. The PDL data analysis unit 303 generates the intermediate data 401 by rendering the rendering objects in the memory region of the upper limit value 903 in the intermediate data 401 in the order analyzed based on the PDL data.

Figure 9B:
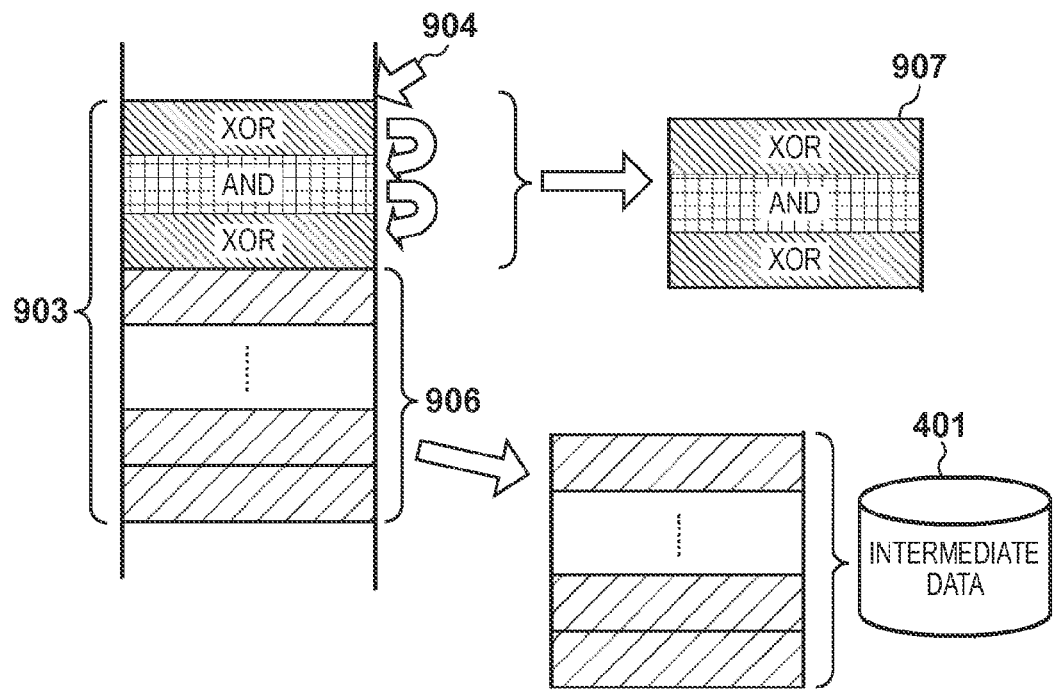

Next, FIG. 9B shows a state in which the PDL data analysis unit 303 searches for generated rendering objects in order starting from the rendering object 905 immediately after the avoidance processing occurred. Based on the rendering object 905, the PDL data analysis unit 303 calculates the address of immediately previous rendering object. Here, since the rendering object depends on the rendering contents that are generated, data size varies depending on rendering methods such as image data, character data, single-color filling data, and the size of the render area. Because of this, the PDL data analysis unit 303 calculates the address of the immediately previous rendering object by subtracting the data size that corresponds to the rendering content from the address 904 of the rendering object 905.

With the address detection method in step S602, it is possible to hold the address of the generated intermediate data in advance when the PDL data analysis unit 303 generates the intermediate data 401. In the present embodiment, the addresses of the rendering objects are specified based on the sizes of the rendering objects when the PDL data analysis unit 303 generates the rendering objects of the intermediate data 401.

Next, in step S603, the PDL data analysis unit 303 determines whether or not the rendering object at the address specified in step S602 is XOR processing. This is done in order for the PDL data analysis unit 303 to determine whether or not the rendering object is a rendering pattern undergoing pseudo-transparency processing immediately prior to the avoidance processing. If the PDL data analysis unit 303 determines that the rendering object is XOR processing, the procedure moves to step S604, and if not, the procedure moves to step S606.

In step S604, the number of rendering objects that are XOR processing is counted. Additionally, in step S605, the PDL data analysis unit 303 temporarily holds the addresses of rendering objects that are XOR processes in the intermediate data 401. The specification of the addresses is performed in a manner similar to that in step S602. In step S606, the PDL data analysis unit 303 determines whether or not the search for all of the rendering objects in the intermediate data 401 has ended. The PDL data analysis unit 303 repeats the series of processes from step S602 to step S606, from the final rendering object of the intermediate data 401 that has been generated up to that point in time and not rendered, up to the head rendering object, and specifies addresses therefor. If all rendering objects have been specified, the procedure moves to step S607.

In step S607, the PDL data analysis unit 303 determines whether an even number or an odd number of rendering objects that are XOR processes exist in the intermediate data 401. This is because the PDL data analysis unit 303 determines whether or not the combination of pseudo-transparency processes, namely XOR processing+AND processing+XOR processing exists in the intermediate data 401, as shown in FIG. 8A. If it is determined that an odd number of XOR processes exist, the PDL data analysis unit 303 determines that lossy compression will be performed using avoidance processing during the pseudo-transparency processing, and that it is possible for a rendering problem to occur, and the procedure moves to step S608. On the other hand, if there is an even number, the procedure moves to step S609. FIG. 5 shows that the avoidance processing takes place after step S504, but steps S608 and S609 are parts of avoidance processing, and in step S507, the avoidance processing is started from the lossy compression of the generated bitmap data.

In step S608, the rendering objects (rendering object group 906 in FIG. 9B) before the first-appearing rendering object that is XOR processing in the intermediate data 401 are transmitted by the PDL data analysis unit 303 to the data rendering unit 304 as the intermediate data 401. That is to say that in this case, the XOR rendering objects are not to be the targets of rendering. The data rendering unit 304 processes the received intermediate data in order and generates bitmap data that is to be the background image. The generated bitmap data undergoes lossy compression, is stored, decompressed thereafter, and then is the background image. Here, since no rendering operation for pseudo-transparency is included in the rendering operation that is to be the target of bitmap data generation in the avoidance processing, noise can be suppressed when rendering is performed. The rendering object group 907 in FIG. 9B is a rendering object group for pseudo-transparency processing that was detected by the determination in step S608. The rendering object ground 907 is used when the PDL data analysis unit 303 generates the intermediate data 401 in the next layer in the avoidance processing.

On the other hand, if it is determined that an even number of XOR processes exist in the intermediate data 401, the PDL data analysis unit 303 transmits the intermediate data 401 to the data rendering unit 304 as-is in step S609. This is because the PDL data analysis unit 303 is holding the rendering pattern for the pseudo-transparency processing such as that in FIG. 8A, and therefore it was determined that lossy compression due to avoidance processing will not occur during the pseudo-transparency processing.

Based on the above description, in Embodiment 1, when avoidance processing is to be performed, the PDL data analysis unit 303 determines whether or not rendering objects at stages during pseudo-transparency processing are included in rendering objects in the intermediate data 401 that has been generated up to that point in time, and thereby rendering patterns in which rendering problems occur are detected and the intermediate data is transmitted to the data rendering unit 304. Since the pseudo-transparency processing in the rendering objects is not suspended during a rendering pattern as in FIGS. 8B and 8C, the data rendering unit 303 can generate regular bitmap data 407 in the page memory 305. According to this, in the flowcharts in FIGS. 5 and 6, even if the print control unit 308 performs lossy compression during avoidance processing, a rendering image with little noise in pseudo-transparent regions is formed.

Embodiment 2

In Embodiment 2, before avoidance processing is to be performed, the PDL data analysis unit 303 determines whether or not a render pattern in which a rendering problem occurs is included in the generated rendering objects, and if it is included, it is saved in a save region. Then, when all of the rendering objects in the series for pseudo-transparency processing have been generated, the rendering objects in the save region are returned to the intermediate data 401. Then, if the avoidance processing is to be performed, no determination of content is performed in particular, and the intermediate data is rendered and compressed. Also, if there is a saved rendered object, it is moved to the intermediate data 401 and stored as a rendering object subsequent to the intermediate data that underwent lossy compression. A state in which the intermediate data 401 is created will be described next with reference to the flowchart in FIG. 7. Note that a program for executing the processing of the flowchart in FIG. 7 exists in the ROM 205 and is executed by the CPU 202. Also, in the present embodiment, since the rendering pattern in which the rendering problem occurs applies to FIGS. 8A to 8C, which are pseudo-transparency processes that were described in Embodiment 1, the description thereof will not be repeated.

In step S701, the PDL data analysis unit 303 interprets PDL data and creates rendering objects. The rendering objects are stored in the document storage unit 307 as the intermediate data 401 that is to be transmitted to the data rendering unit 304. Here, a region in which XOR processes are stored along with the intermediate data 401 exists in the document storage unit 307.

In step S702, the PDL data analysis unit determines whether or not the amount of intermediate data 401 has exceeded the upper limit value memory capacity. If the PDL data analysis unit determines that the memory capacity of the intermediate data 401 exceeds the upper limit value, the avoidance processing is executed in step S712. If the capacity of the intermediate data 401 is less than the upper limit value, the procedure moves to step S703. In step S712, the rendering objects that have been generated up to that point in time are transmitted to the data rendering unit 304, rendered, undergo lossy compression, and the compressed image data is stored in the document storage unit 307 as a new rendering object. Thereafter, the processing continues from step S703.

In step S703, the PDL data analysis unit 303 determines whether or not the rendering objects created in step S701 are XOR processing. If it is determined in step S703 that the rendering objects from step S701 are XOR processing, the PDL data analysis unit 303 determines in step S704 whether or not the rendering objects that are XOR processing already exist in the save region. If it is determined that the XOR processes exist in the save region, the PDL data analysis unit adds all of the rendering objects from step S701 that exist in the save region to the intermediate data 401 in step S705. The rendering objects that exist in the save region at this time are a command group that forms a series of rendering patterns for pseudo-transparency processing, namely XOR processing+AND processing+XOR processing as shown in FIG. 8A. It is possible to prevent lossy compression caused by avoidance processing during pseudo-transparency processing from being performed due to grouping together rendering object groups for pseudo-transparency processing and storing them in the intermediate data 401. Next, in step S706, the PDL data analysis unit 303 deletes all of the data that was being held in the save region. Here, the PDL data analysis unit 303 can re-use the save region for the next rendering object group for pseudo-transparency processing by deleting the data in the save region.

In step S708, the PDL data analysis unit 303 adds the rendering objects generated in step S701 to the intermediate data 401. At this time, the location at which the rendering objects are to be added is the address after the rendering object group for pseudo-transparency processing that was moved from the save region.

In step S710, the PDL data analysis unit 303 determines whether or not PDL data exists. If the generation of all of the rendering objects in the page has ended, the PDL data analysis unit 303 transmits the intermediate data 401 that has been generated and stored in the document storage unit 307 up to that point in time to the data rendering unit 304 in step S711. The intermediate data is rendered and is one page of bitmap data, and if the procedure branches from step S710, the intermediate data is supplied to the printing process. On the other hand, if unprocessed PDL data still remains, the PDL data analysis unit 303 generates the next rendering object from the PDL data in step S701. The PDL data analysis unit 303 generates the intermediate data 401 by repeating the processing of steps S701 to S710.

Figure 7:
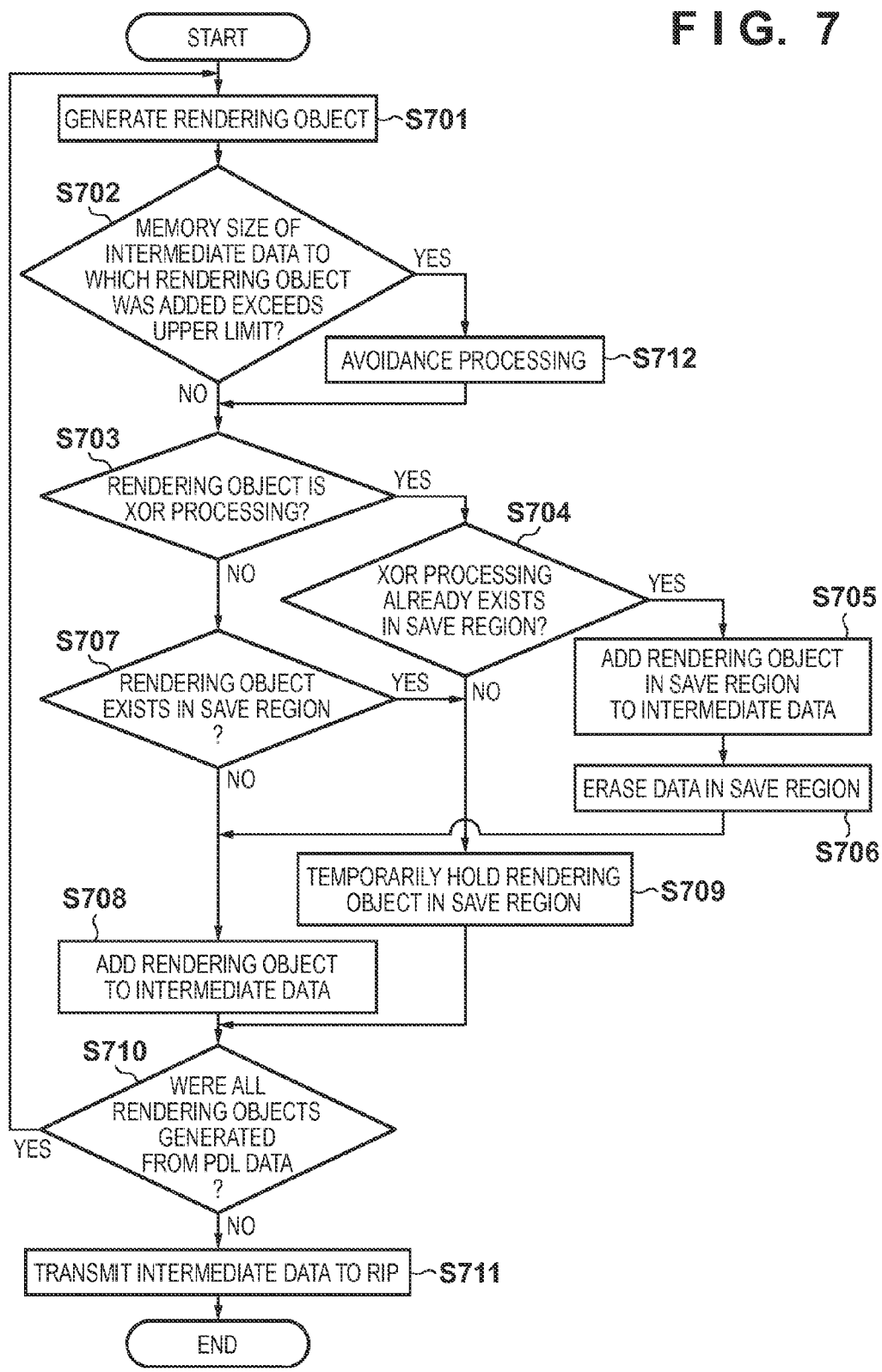
FIG. 7 is a flowchart showing a method of avoiding a rendering problem by detecting pseudo-transparency processing in advance before avoidance processing is to be performed, according to Embodiment 2.

The remaining branching of FIG. 7 will be described below. If it is determined in step S704 that no XOR processes exist in the save region, the PDL data analysis unit 303 temporarily stores the rendering objects of XOR processes generated in step S701 in the save region in step S709. The processing of step S709 is executed such that even if avoidance processing will occur in a stage at which the rendering objects up to a point in the pseudo-transparency processing are being generated, the rendering objects of the pseudo-transparency processing are removed from the rendering targets. The PDL data analysis unit 303 determines in step S710 whether or not the next rendering object can be generated again from the PDL data.

In the determination processing of step S703, if the PDL data analysis unit 303 determines that the generated rendering objects are not XOR processing, the procedure branches to step S707.

In step S707, the PDL data analysis unit 303 determines whether or not rendering objects exist in the save region. If any rendering object exists in the save region, it is an XOR process rendering object, and it is determined that rendering objects currently being processed are AND processes, and those rendering objects are held in the same save region. In order to prevent flaws from occurring in AND processes during XOR processes, the PDL data analysis 303 always determines whether or not rendering objects exist in the save region. On the other hand, if the PDL data analysis unit 303 determines in the branching of step S707 that no rendering objects exist in the save region, it is determined that the rendering object is not part of the pseudo-transparency processing of XOR processing+AND processing+XOR processing, and the rendering object is added as-is to the intermediate data 401.

According to the above description, with Embodiment 2, it is guaranteed that the data rendering unit 304 will subject the overlaying of the same color data in the same region to the XOR process in the color compositing processing unit 407. As a result, even if the PDL data analysis unit 303 moves to the avoidance processing and the data rendering unit 304 generates the bitmap data 407 from the intermediate data 401 up to a time during the pseudo-transparency processing, it is possible to always perform rendering in the same page without the avoidance processing being performed within the series of processes, namely the XOR processing+AND processing+XOR processing. Accordingly, the rendering objects have a separate layout area due to the avoidance processing, and even if the rendering objects undergo lossy compression in the print control unit 308 and are rendered once again as bitmap data, it is possible to reduce the effect of noise.

Note that step S601 in Embodiment 1 may be executed immediately before step S703. In that case, if the print data does not support transparency, the procedure moves to step S703, and if the data supports transparency, the procedure moves to step S708.

As described above, in Embodiments 1 and 2, if it is determined that the rendering objects that were stored as intermediate data have an amount of data that exceeds a predetermined value, or in other words, if avoidance processing is to be performed, a rendering object group that is a series for pseudo-transparency processing is treated as an indivisible rendering object group and the entirety of a rendering object group is subjected to rendering during the avoidance processing, or it is not subjected to it at all. As a result of this, as described above, it is possible to prevent image quality from deteriorating due to bitmapping processing and lossy compression being executed during the pseudo-transparency processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274052, filed Dec. 14, 2012, which is hereby incorporated by reference herein in its entirety.

What is claimed is:
1. An image forming apparatus comprising:
a reception unit configured to receive print data including a plurality of objects;
a determination unit configured to determine, for each of the plurality of the objects, whether or not an object is a part of a specific series of objects;
a storage control unit configured to store an object of the plurality of the objects which is determined not to be a part of the specific series into a first memory area, and to store an object of the plurality of the objects which is determined to be a part of the specific series into a second memory area and
a processing unit configured to check an amount of objects stored in the first memory area, and to generate a single bitmap by rendering the objects stored in the first memory area to compress the generated single bitmap in a lossy manner if the checked amount reaches a predetermined condition, wherein the storage control unit checks a series of objects being stored in the second memory area and a current object of the plurality of the objects, and stores the objects having been stored in the second memory area and the current object into the first memory area if the checked series matches the specific series.

2. The image forming apparatus according to claim 1, wherein the print data is described in a page description language.

3. The image forming apparatus according to claim 1, wherein the specific series of objects includes at least an object for XOR logical operation, an object for AND logical operation, and an object for XOR logical operation in order.

4. The image forming apparatus according to claim 1, wherein the storage control unit stores the current object of the plurality of the objects into the first memory area in a form of intermediate data.

5. The image forming apparatus according to claim 1, wherein the objects whose amount is checked by the processing unit and which are rendered by the processing unit are not a whole of the plurality of the objects included in the print data.

6. The image forming apparatus according to claim 1, wherein the storage control unit reuses, after the re-storing, the second memory area for storing another object of the plurality of the objects.

7. The image forming apparatus according to claim 1, wherein the storage control unit and the processing unit operate for the current object of the plurality of the objects, in turn.

8. The image forming apparatus according to claim 6, wherein the processing unit operates for the current object of the plurality of the objects, then the storage control unit operates for a next object of the plurality of the objects.

9. The image forming apparatus according to claim 1, wherein the processing unit generates the single bitmap by rendering the objects stored in the first memory area without rendering any objects being stored in the second memory area if the checked amount reaches the threshold.

10. The image forming apparatus according to claim 1, further comprising:
a rendering unit configured to render a whole of the plurality of objects having been stored in the first memory area, if the processing unit does not generate the single bitmap when the processing unit operates for the print data.

11. The image forming apparatus according to claim 1, wherein the processing unit performs the generation if the checked amount reaches a threshold.

12. An image forming method comprising:
receiving print data including a plurality of objects;
determining, for each of the plurality of the objects, whether or not an object is a part of a specific series of objects;
performing a control such that an object of the plurality of the objects which is determined not to be a part of the specific series is stored into a first memory area, and an object of the plurality of the objects which is determined to be a part of the specific series is stored into a second memory area;
checking an amount of objects stored in the first memory area;
generating a single bitmap by rendering the objects stored in the first memory area to compress the generated single bitmap in a lossy manner if the checked amount reaches a predetermined condition;
checking a series of objects being stored in the second memory area and a current object of the plurality of the objects; and
storing the objects having been stored in the second memory area and the current object into the first memory area if the checked series matches the specific series.

13. The non-transitory computer readable medium storing a program which causes a computer to execute an image forming method, the method comprising:
receiving print data including a plurality of objects;
determining, for each of the plurality of the objects, whether or not an object is a part of a specific series of objects;
performing a control such that an object of the plurality of the objects which is determined not to be a part of the specific series is stored into a first memory area, and an object of the plurality of the objects which is determined to be a part of the specific series is stored into a second memory area;
checking an amount of objects stored in the first memory area;
generating a single bitmap by rendering the objects stored in the first memory area to compress the generated single bitmap in a lossy manner if the checked amount reaches a predetermined condition;
checking a series of objects being stored in the second memory area and a current object of the plurality of the objects; and
storing the objects having been stored in the second memory area and the current object into the first memory area if the checked series matches the specific series.

* * * * *